United States Patent
Jordan et al.

(10) Patent No.: US 7,318,915 B2
(45) Date of Patent: *Jan. 15, 2008

(54) OXIDATION-REDUCTION CATALYST AND ITS PROCESS OF USE

(75) Inventors: Jeffrey D. Jordan, Williamsburg, VA (US); Anthony Neal Watkins, Hampton, VA (US); Jacqueline L. Schryer, Hampton, VA (US); Donald M. Oglesby, Virginia Beach, VA (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/342,660

(22) Filed: Jan. 13, 2003

(65) Prior Publication Data

US 2003/0144143 A1 Jul. 31, 2003

Related U.S. Application Data

(60) Provisional application No. 60/351,733, filed on Jan. 25, 2002.

(51) Int. Cl.
*B01D 53/46* (2006.01)
*B01J 23/00* (2006.01)
*B01J 21/00* (2006.01)

(52) U.S. Cl. ............... 423/245.3; 502/302; 502/303; 502/304; 502/326; 502/330; 502/339; 502/344; 502/347; 502/349; 502/352

(58) Field of Classification Search ............... 502/302, 502/303, 304, 326, 330, 339, 340, 347, 349, 502/352; 423/245.1, 247, 239.1
See application file for complete search history.

(56) References Cited

U.S. PATENT DOCUMENTS

| | | | | |
|---|---|---|---|---|
| 4,146,438 | A * | 3/1979 | de Nora et al. ............... 205/43 |
| 4,182,694 | A * | 1/1980 | Lauder ........................ 502/303 |
| 4,419,278 | A * | 12/1983 | Gordon ..................... 252/501.1 |
| 4,492,769 | A * | 1/1985 | Blanchard et al. ........... 502/262 |
| 4,829,035 | A | 5/1989 | Upchurch et al. |
| 4,855,274 | A | 8/1989 | Upchurch et al. |
| 4,912,082 | A | 3/1990 | Upchurch et al. |
| 4,980,244 | A * | 12/1990 | Jackson ........................ 428/670 |
| 4,991,181 | A | 2/1991 | Upchurch et al. |
| 5,283,041 | A * | 2/1994 | Nguyen et al. ........... 423/240 S |
| 5,578,283 | A * | 11/1996 | Chen et al. .............. 423/240 R |
| 5,585,083 | A | 12/1996 | Kielin et al. |
| 5,788,950 | A * | 8/1998 | Imamura et al. ............. 423/263 |
| 5,948,965 | A | 9/1999 | Upchurch et al. |
| 5,990,039 | A * | 11/1999 | Paul et al. .................... 502/326 |
| 6,121,187 | A * | 9/2000 | Maier ........................... 502/232 |
| 6,132,694 | A | 10/2000 | Wood et al. |
| 6,235,673 | B1 * | 5/2001 | Zoeller et al. ............... 502/159 |
| 6,239,064 | B1 * | 5/2001 | Nguyen et al. .............. 502/328 |
| 6,274,765 | B1 * | 8/2001 | Borchert et al. ............. 562/549 |
| 6,331,075 | B1 | 12/2001 | Amer et al. |

(Continued)

*Primary Examiner*—Cam N. Nguyen
(74) *Attorney, Agent, or Firm*—Helen M. Galus

(57) ABSTRACT

This invention relates generally to a ruthenium stabilized oxidation-reduction catalyst useful for oxidizing carbon monoxide, and volatile organic compounds, and reducing nitrogen oxide species in oxidizing environments, substantially without the formation of toxic and volatile ruthenium oxide species upon said oxidizing environment being at high temperatures.

21 Claims, 2 Drawing Sheets

U.S. PATENT DOCUMENTS 6,753,293 B1 6/2004 Kielin et al.
2003/0139290 A1* 7/2003 Jordan et al. ............... 502/344
2003/0144143 A1 7/2003 Jordan et al.
2004/0009605 A1 1/2004 Brown et al.
2005/0079115 A1* 4/2005 Jordan et al. ............ 423/213.5

* cited by examiner

OXIDATION-REDUCTION CATALYST AND ITS PROCESS OF USE

ORIGIN OF THE INVENTION

This invention was jointly made by employees of the United States Government and contract employees during the performance of work under a NASA contract which is subject to the provisions of Public Law 95-517 (35 U.S.C. 202) in which the contractor has elected not to retain title and may be manufactured and used by or for the government for governmental purposes without the payment of royalties thereon or therefore.

BACKGROUND OF THE INVENTION

1. Field of the Invention

This invention relates generally to a stabilization mechanism for use in oxidation/ reduction catalyst systems. It particularly relates to a ruthenium stabilization mechanism that enables the use of inexpensive metallic species within catalyst systems targeted for the elimination of toxic emissions such as carbon monoxide, hydrocarbons and other volatile organics, and specifically nitrogen oxide species.

2. Description of the Related Art

Internal combustion engines are the primary source of air-born pollutants in the United States and many parts of the world. Only since the 1970's have regulatory organizations led by the Environmental Protection Agency (EPA) and sanctioned by the Clean Air Act of 1973 begun initiating mandates for pollution control on ground vehicles. Performance requirements focus on the destruction of the three primary pollutants present in the exhausted emission stream: 1) hydrocarbons (i.e., uncombusted fuel, HC), 2) carbon monoxide (CO), and 3) nitrogen oxides (NOx).

EPA and California Air Resource Bureau (CARB) certification of automotive catalytic converter systems requires a catalyst technology to meet minimum performance requirements for a period commensurate with its final application. Gasoline-powered automobile aftermarket catalysts, for example, must currently eliminate 70% of emitted CO, 70% HC, and 60% NOx for a period of 25,000 miles operation (OE market>100,000 miles). Product durability is evaluated through approved rapid aging tests (RAT) that involve subjecting the catalyst to the emissions stream of a full-scale automobile engine operating under elevated inlet temperatures (e.g., 850° C.) and varying fuel-to-air ratios ranging from rich to lean relative to stoichiometric (i.e., ideal) operating conditions. Catalytic converter performance is characterized by the efficiency of the conversion process and product durability in maintaining the mandated pollutant destruction levels.

Catalytic converters are complex, highly proprietary systems, all exploiting precious metal (PM) species as the primary catalytic elements. Catalyst systems for automotive converter applications, typically called three-way catalysts, consist of at least four primary components: 1) substrate, 2) inactive support material, 3) active oxygen storage material, and 4) precious metal (PM) species such as the primary oxidation—platinum (Pt) and palladium (Pd) and reduction—rhodium (Rh) and iridium (Ir) metals. Substrates are typically honeycomb geometries of a mixed metal oxide composite (e.g., cordierite) or in a few cases, metal alloys (e.g., FeCrAl). Standard automobile converters typically use a single cordierite brick (e.g., 400 cells/square inch) of volume commensurate with engine size.

The inactive wash coat (eg., aluminum (oxide, alumina)), oxygen storage material (e.g., cerium oxide, ceria), and some cases other metal species (e.g., iron, cobalt, nickel) used to facilitate electron transfer in the insulating support material are applied to the substrate from a particles-in-solvent slurry wash coat process. Following drying and calcining treatments at temperatures typically not exceeding 550° C. for six hours, precious metals are applied to the oxide coating quantitatively from salt solutions. Product assembly then follows an additional thermal treatment.

The key problem is that PMs are scarce commodities found naturally in quantity only in isolated regions of the Asian and African continents. Moreover, the dynamic market of individual PM species has driven, and will continue to dictate, the direction of catalyst technology developments. As a result, it is economically prudent and environmentally responsible to pursue the development of next generation catalyst systems that exploit more efficient active support materials and more readily available (i.e., less costly) metallic species for pollutant destruction.

NASA Langley Research Center (LaRC) has developed a tin oxide/ceria-based three-way catalyst technology described in U.S. patent application Ser. No. 10/056,845 filed Jan. 22, 2002, and hereby incorporated herein as if set forth in its entirety. The present invention uses ruthenium metal for NOx remediation, an attractive alternative to Rh from an availability, and hence cost perspective, often trading at prices less than Rh by an order of magnitude. Ruthenium reduces NOx as well as supports the oxidation of CO and HC; however, its use was originally abandoned by the industry following research in the 1970's that showed its predilection to form volatile and toxic ruthenium oxide species that would be emitted into the environment. Therefore, exploiting ruthenium in three-way catalysts for NOx destruction required the stabilization of ruthenium under the high temperature, oxidizing conditions of the automotive exhaust system.

SUMMARY OF THE INVENTION

The purpose of this innovation is to offer a cost-effective alternative technology for the remediation of nitrogen oxide (NOx) species for a variety of applications that include, but are not limited to, automotive catalytic converter, stationary energy source, diesel, and alternative-fuel emissions applications. The innovation involves the stabilization of ruthenium metal for use in high-temperature applications, particularly under oxidizing conditions that can lead to the formation of toxic and volatile ruthenium oxide species (e.g., $RuO_2$, $RuO_4$) that would be emitted from the exhaust system. The innovation exploits a discovered synergism between zirconia (i.e., zirconium oxide [$ZrO_2$]) and ruthenium metal that manifests in significantly enhanced thermal stability of ruthenium on the surface of the LaRC three-way catalyst technology.

DETAILED DESCRIPTION OF THE INVENTION

Figure 1:
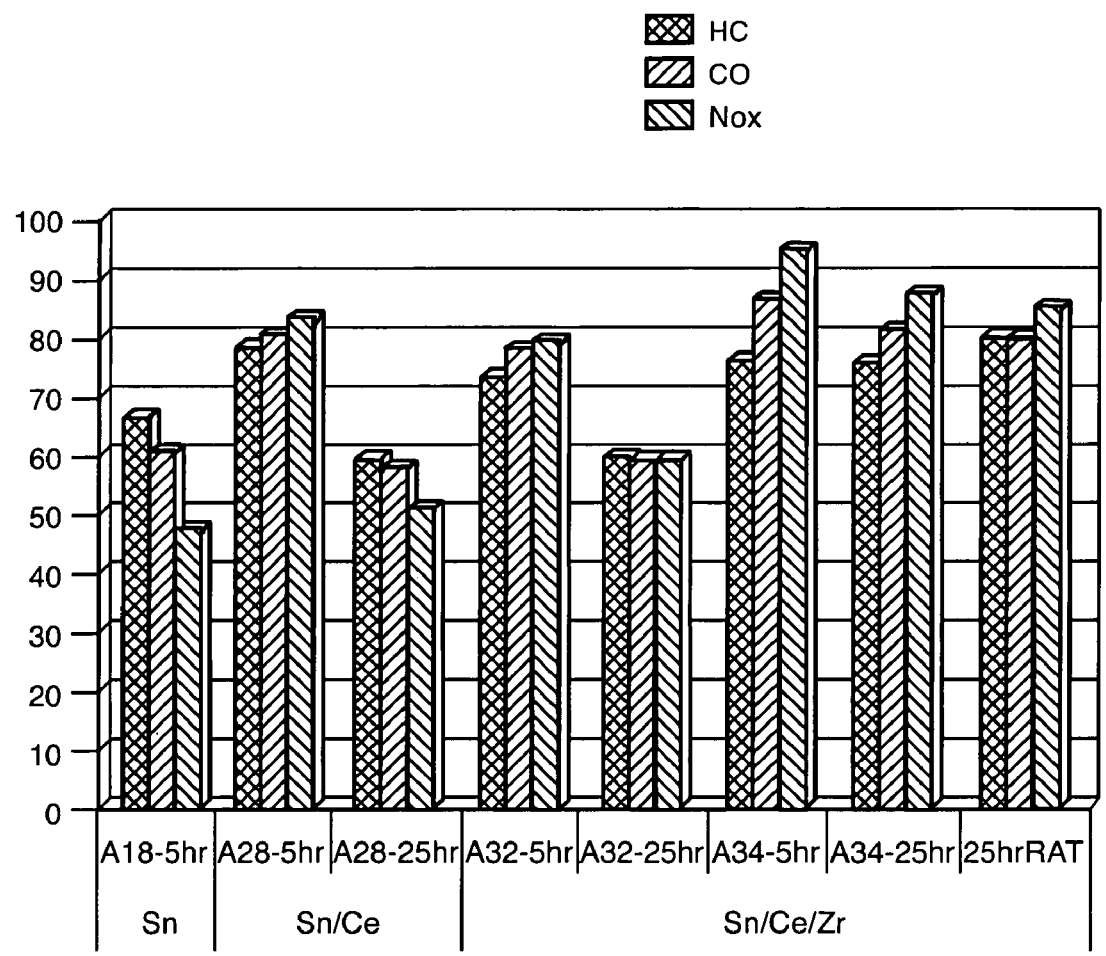
FIG. 1 is a graph demonstrating the performance efficiency (%) for catalyst prototypes containing tin oxide only (Sn), Sn/ceria (Sn/Ce), and Sn/Ce, zirconia (Sn/Ce/Zr) composites following various aging times under steady-state and RAT aging cycles (1 hr=1000 miles).

The current embodiment of the LaRC automotive catalyst technology consists of a stabilized tin oxide/ceria/zirconia active layer dispersed in a high surface area alumina matrix that is applied simply by immersing the honeycomb substrate in a single solution slurry. Said slurry consists of a dispersion of the precursor aluminum isopropoxide in the miscible tin, cerium, and zirconium ethylhexanoate salt solutions, followed by thermal treatment. The catalyst employs Pt for CO and HC oxidation and Ru for NOx reduction. Current PM loadings (0.01 g/in 3 total) are lower than currently employed in industry by 25-50%, and ongoing efforts are realizing further reductions. The novel active surface area is maintained under accelerated aging conditions, with the most recent prototype exhibiting 80%, 80%, and 85% efficiency levels for CO, HC, and NOx destruction, respectively, following 25,000 miles of RAT-based simulated operation (i.e., 25 hours at an inlet temperature of 850° C. and varying lean/rich drive cycles). Moreover, material costs are at least 25-50% less than the current technology used for automotive aftermarket systems.

The use of low-cost transition metals such as ruthenium for NOx remediation has been, heretofore, prevented by the predilection of ruthenium, among other metals, to form toxic and volatile oxide species under high-temperature oxidizing conditions typical of most emission streams. Until now there have been no mechanisms proposed for the stabilization of ruthenium to enable its use for high-temperature catalytic applications. Exploiting the synergism between zirconia (i.e., zirconium oxide) and ruthenium is a unique approach to obtain stabilization of both the tin oxide/ceria system and the surface-bound ruthenium. EPA-approved durability test data showed poor NOx performance for all tin oxide-only and tin oxide/ceria-based catalysts following 5 and 15 hours of thermal aging, respectively. Incorporation of zirconia within the tin oxide/ceria system resulted in NOx destruction performance that exceeded EPA levels through 25 hours of durability testing (i.e., automotive catalytic converter aftermarket requirement).

In addition, X-ray fluorescence experiments were performed to determine the fate of ruthenium following thermal aging. The results show that ruthenium is lost from the surface of all catalyst samples not containing zirconia following subjection to a flowing air stream at 960° C. Together, these results indicate a strong, positive synergism between ruthenium and zirconia that has enabled the successful incorporation of an inexpensive metallic species for NOx elimination in a three-way catalyst system. This approach further extends the possibility of exploiting additional alternative metal species for oxidation of CO, HC, and other volatile organics as well the reduction of NOx, thereby, reducing reliance on scarce, expensive, and rapidly depleting precious metal species. The ultimate impact will be a reduction in the cost for NOx remediation technology that will support its broader application (e.g., to gas-powered lawn mowers, in third-world countries) and significantly reduce the pollution of the environment. Moreover, reductions in the cost of NOx-remediation technology will also be supported by economic competition elements that accompany market insertion of new and unique and cost-effective catalytic systems.

EXAMPLES

Catalysts incorporating tin oxide as the only reducible metal oxide coating exhibited poor NOx performance following even brief exposure to stoichiometric, or steady state (SS) accelerated aging conditions as shown in FIG. 1 (A18-5 hr). Addition of ceria served to stabilize the tin oxide system, manifesting in acceptable performance through 5 hours of SS aging but all Sn/Ce prototypes failed to meet pollutant destruction requirements following 25 hours of SS aging. The addition of Zr, however, resulted in the formation of a catalyst that exhibited durability through 25 hours of SS aging at elevated inlet temperature of 850° C., resulting in a catalyst bed temperature of approximately 960° C. Thus, these data provided evidence for a positive synergism between the Ru and Zr that manifested in the catalyst formulation maintaining its NOx destruction capability under elevated temperatures.

The poor NOx performance results recovered for the Sn-only and Sn/Ce systems provide evidence that Ru surface active sites were being lost during this high-temperature operation. This could occur due to thermal reorganization (e.g., sintering) of the surface, poisoning by contaminants blocking the Ru active sites, or by the formation and subsequent volatilization of ruthenium oxide (RuOx) species. The fate of Ru following durability testing was investigated by measuring the amount of Ru present in a catalyst sample before and after being subject to a flowing air stream at 960° C.

For these experiments, one-inch diameter cordierite substrates (0.5-in. length, 400 cells/in$^2$) were coated with ethyl hexanoate salt solutions containing at least SnEH, in addition to CeEH and ZrEH. Promoter metals (i.e., iron, nickel, cobalt) were then deposited onto the reducible metal oxide layer by dipping the coated substrate in aqueous solutions of nitrate salts, followed by a thermal treatment at 550° C. for 6 hours. Pt and Ru precious metal species were then deposited quantitatively by applying solutions to the coated substrate using a Pasteur pipette. This was followed by a final thermal treatment identical to that applied to the promoter metal species layer.

Figure 2:
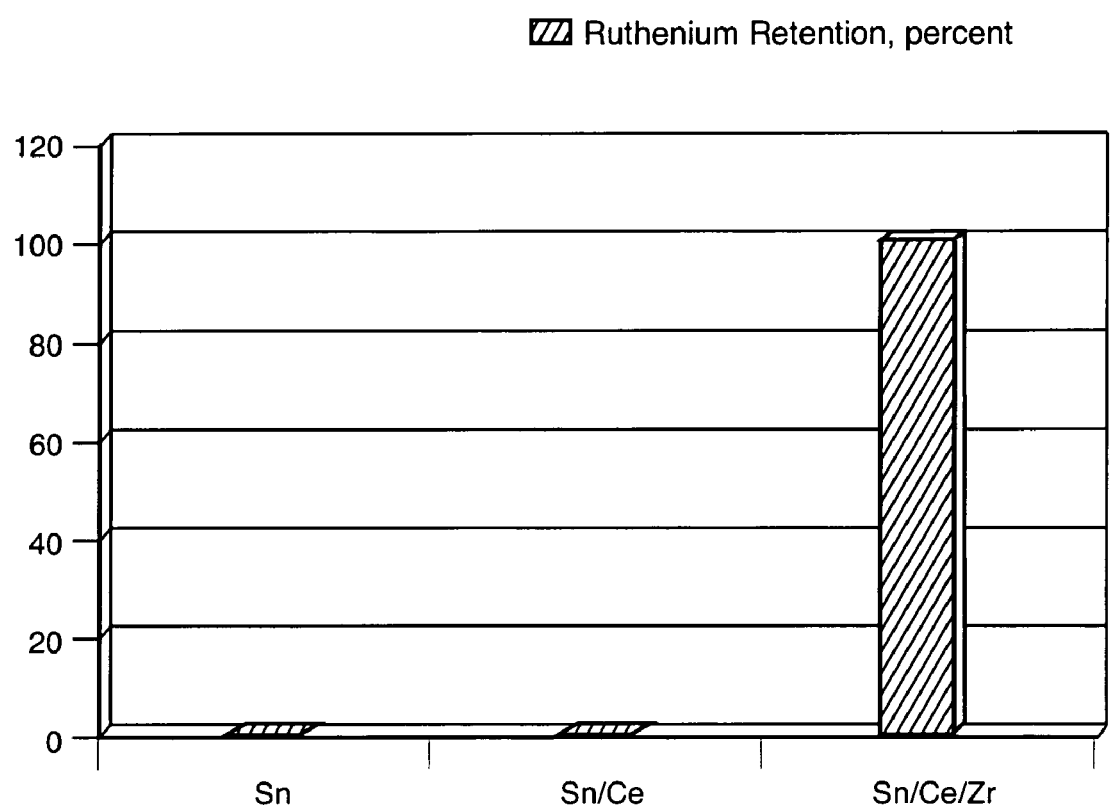
FIG. 2 is a graph demonstrating the effect of ceria (Ce) and zirconia (Zr) addition to the tin oxide (Sn) catalyst system on the retention of ruthenium following subjecting the catalyst to five hours of air flow at 960° C. Ruthenium surface concentrations were determined using x-ray fluorescence measurements.

X-ray fluorescence measurements were then performed on the fresh, or "green" catalyst prototypes. X-ray fluorescence is well suited to provide elemental information of species sequestered on the surface of the substrate sample. To exploit this technique, samples were positioned within the X-ray fluorescence instrument and marked to ensure reproducible alignment of the sample within the interrogation area. X-ray signatures were recovered for Ru prior to subjecting the samples to a high-temperature airflow for 6 hours. To mimic the durability conditions, cordierite samples were positioned within the center of a tube furnace that was maintained at 960° C. Airflow was maintained for 6 hours, after which the samples were allowed to cool to room temperature prior to repeating the X-ray fluorescence measurements on the exact location performed previously. The efficacy of this technique was verified prior to performing the durability measurements by repositioning the sample in the chamber multiple times and repeating the measurement. Measurement uncertainties of less than one percent were recovered using this approach. The X-ray fluorescence amplitudes recovered following thermal aging were normalized to the initial Ru surface concentration, and the results in terms of percent Ru maintained are shown in FIG. 2.

Through these measurements, it was determined that nearly all of the Ru active sites were being lost from the surface of the tin oxide and tin oxide/ceria composites at the temperature maximum it was subject to in the SS aging treatment (960° C.). These results indicate that the tin oxide/ceria/zirconia composite system exhibited stability necessary to maintain catalytic performance superior to EPA and CARB mandates to at least 25,000 miles.

We claim:

1. A stabilized oxidation-reduction catalyst comprising:
   a reducing species consisting of ruthenium;
   an oxidizing species selected from the group consisting of platinum, palladium, silver, and gold; and
   an active layer consisting solely of mixed-metal oxides, said mixed-metal oxides comprising:
   a stabilizing species consisting of zirconium oxide, in an amount sufficient for the effective stabilization of said ruthenium;
   a first metal oxide which possesses more than one stable oxidation state including at least tin oxide; and
   a second metal oxide selected from the group consisting of cerium oxide, hafnium oxide, and lanthanum oxide;
   wherein said stabilized catalyst is formulated to permit the oxidization of carbon monoxide and volatile organic compounds, and the reduction of nitrogen oxide species, in high temperature oxidizing environments substantially without the formation of toxic and volatile ruthenium oxide species.

2. The catalyst of claim 1, further comprising:
   at least one promoter selected from the group consisting of oxides of iron, nickel and cobalt, wherein said at least one promoter is disposed on said mixed-metal oxide layer and said reducing and said oxidizing species are disposed on or adjacent said promoter.

3. The catalyst of claim 1 wherein said second metal oxide is cerium oxide.

4. The catalyst of claim 1 wherein said oxidizing species is platinum.

5. The catalyst of claim 1 wherein said oxidizing species is palladium.

6. A process for the oxidation of carbon monoxide and volatile organic compounds, and the reduction of nitrogen oxide, in an oxidizing environment, substantially without the formation of toxic and volatile ruthenium oxide species upon said environment having a high temperature, which process comprises exposing carbon monoxide, volatile organic compounds, and nitrogen oxide to a stabilized catalyst comprising:
   a reducing species consisting of ruthenium;
   a stabilization species consisting of zirconium oxide, for stabilizing said ruthenium;
   an oxidizing species selected from the group consisting of platinum, palladium, silver, and gold;
   a first metal oxide which possesses more than one stable oxidation state including at least tin oxide; and
   a second metal oxide selected from the group consisting of cerium oxide, hafnium oxide, and lanthanum oxide;
   wherein said zirconium oxide, first metal oxide and second metal oxide together form at least a portion of an active layer which consists solely of mixed-metal oxides.

7. The process of claim 6, wherein said catalyst further comprises:
   at least one promoter selected from the group consisting of oxides of iron, nickel and cobalt; wherein said at least one promoter is disposed on said mixed-metal oxide layer and said reducing and said oxidizing species are disposed on or adjacent said promoter.

8. The process of claim 6 wherein said second metal oxide is cerium oxide.

9. The process of claim 6 wherein said oxidizing species is platinum.

10. The process of claim 6 wherein said oxidizing species is palladium.

11. A stabilized oxidation-reduction catalyst useful for oxidizing carbon monoxide and volatile organic compounds, and reducing nitrogen oxide species, in high temperature applications without substantial loss of ruthenium surface active sites, said catalyst comprising:
    an oxidizing species selected from the group consisting of platinum, palladium, silver, and gold;
    a reducing species consisting of ruthenium; and
    a mixed-metal oxide layer consisting solely of metal-oxides, said metal oxides comprising:
    a stabilizing species consisting of zirconium oxide, in an amount sufficient to effectively stabilize said ruthenium;
    a first metal oxide which possesses more than one stable oxidation state including at least tin oxide; and
    a second metal oxide selected from the group consisting of cerium oxide, hafnium oxide, and lanthanum oxide.

12. The catalyst of claim 11, further comprising:
    at least one promoter selected from the group consisting of oxides of iron, nickel and cobalt; wherein said at least one promoter is disposed on said mixed-metal oxide layer and said reducing and said oxidizing species are disposed on or adjacent said promoter.

13. The catalyst of claim 11 wherein said second metal oxide is cerium oxide.

14. The catalyst of claim 11 wherein said oxidizing species is platinum.

15. The catalyst of claim 11 wherein said oxidizing species is palladium.

16. A stabilized oxidation-reduction catalyst comprising:
    a reducing species consisting of ruthenium;
    a stabilizing species consisting of zirconium oxide, in an amount sufficient to effectively stabilize said ruthenium;
    an oxidizing species selected from the group consisting of platinum, palladium, silver, and gold;
    a first metal oxide which possesses more than one stable oxidation state including at least tin oxide;
    a second metal oxide selected from the group consisting of cerium oxide, hafnium oxide, and lanthanum oxide;
    wherein said stabilization of said ruthenium substantially reduces the loss of ruthenium active sites in high temperature applications; and
    wherein said zirconium oxide, first metal oxide and second metal oxide together form at least a portion of an active layer which consists solely of mixed-metal oxides.

17. A process for the oxidation of carbon monoxide and volatile organic compounds, and the reduction of nitrogen oxide, in elevated temperature environments, without a substantial loss of ruthenium surface active sites, using a stabilized catalyst comprising:
    an oxidizing species selected from the group consisting of platinum, palladium, silver, and gold;
    a reducing species consisting of ruthenium; and
    a mixed-metal oxide layer consisting solely of metal-oxides, said metal oxides comprising:
    a stabilization species consisting of zirconium, in an amount sufficient to stabilize said ruthenium;
    a first metal oxide which possesses more than one stable oxidation state including at least tin oxide; and a second metal oxide selected from the group consisting of cerium oxide, hafnium oxide, and lanthanum oxide.

18. The process of claim 17, wherein said stabilized catalyst further comprises:
at least one promoter selected from the group consisting of oxides of iron, nickel and cobalt; wherein said at least one promoter is disposed on said mixed-metal oxide layer and said reducing and said oxidizing species are disposed on or adjacent said promoter.

19. The process of claim 17 wherein said second metal oxide is cerium oxide.

20. The process of claim 17 wherein said oxidizing species is platinum.

21. The process of claim 17 wherein said oxidizing species is palladium.

* * * * *

UNITED STATES PATENT AND TRADEMARK OFFICE
CERTIFICATE OF CORRECTION

PATENT NO. : 7,318,915 B2  Page 1 of 1
APPLICATION NO. : 10/342660
DATED : January 15, 2008
INVENTOR(S) : Jeffrey D. Jordan et al.

It is certified that error appears in the above-identified patent and that said Letters Patent is hereby corrected as shown below:

ON TITLE PAGE

In Item (75) Inventors, after Donald M. Oglesby, Virginia Beach, VA (US)
insert -- ; Suresh T. Gulati, Elmira, NY (US) --

Signed and Sealed this
Twenty-eighth Day of June, 2011

David J. Kappos
*Director of the United States Patent and Trademark Office*